Dec. 22, 1964    A. P. MUSY    3,162,064
HYDRAULICALLY OPERATED TOOL HOLDER INDEXING
Filed Sept. 19, 1963                                           2 Sheets-Sheet 1
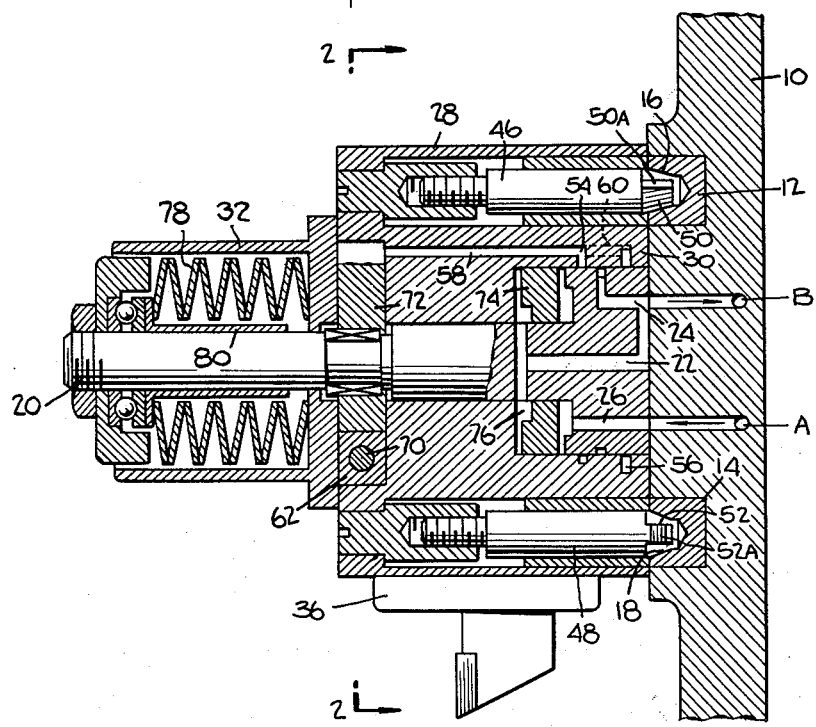
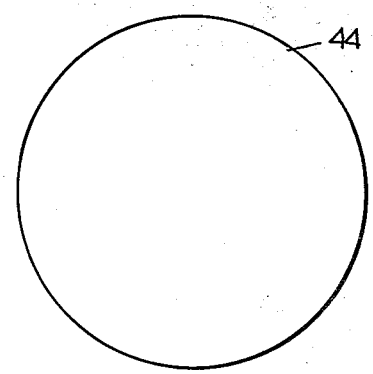
INVENTOR.
ANDRÉ PAUL MUSY
BY Kenyon & Kenyon
ATTORNEYS Dec. 22, 1964    A. P. MUSY    3,162,064
HYDRAULICALLY OPERATED TOOL HOLDER INDEXING
Filed Sept. 19, 1963    2 Sheets-Sheet 2
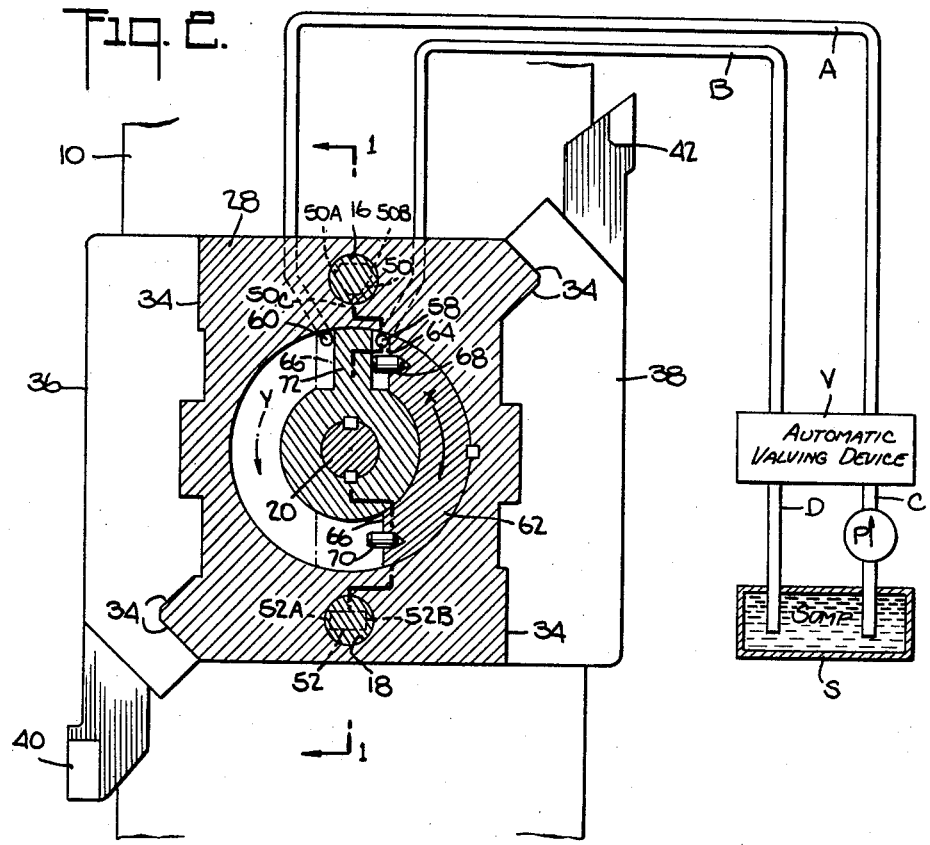
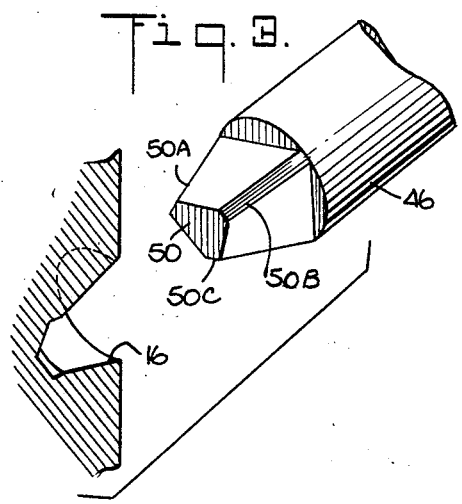
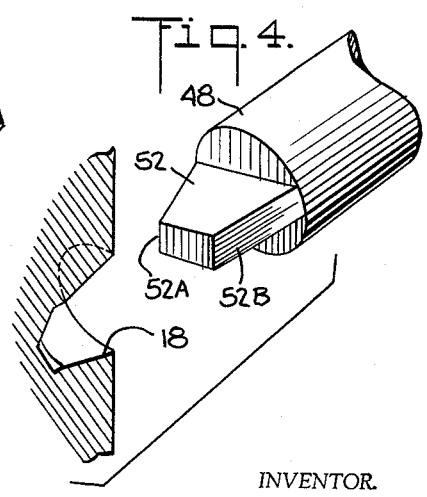
INVENTOR.
ANDRÉ PAUL MUSY
BY Kenyon & Kenyon
ATTORNEYS

United States Patent Office 3,162,064
Patented Dec. 22, 1964

3,162,064
HYDRAULICALLY OPERATED TOOL HOLDER INDEXING
Andre Paul Musy, Couvet, Neuchatel, Switzerland, assignor to Edouard Dubied et Cie (Societe Anonyme), Couvet, Neuchatel, Switzerland
Filed Sept. 19, 1963, Ser. No. 310,092
Claims priority, application Switzerland, Sept. 9, 1959, 78,033
1 Claim. (Cl. 74—822)

The present invention relates to a tool holder turret having automatic control for changing tools and more particularly to such a tool holder turret adapted to perform roughing down and finishing operations in ons chucking of the work with appropriate tools for each working operation, whereby the tools are adjusted on the corresponding tool holders separately from the machine and one or the other of these tools may be put to work automatically for a working operation at any desired moment and without any loss of time during the return stroke of the cross slide.

The heretofore known tool holder turrets of this type generally comprise a block provided with means for fixing the tools, a centering device and a mechanical locking device. Operation of such turrets requires considerable time for placing the tools into the block or changing the position of the block to bring one or the other of the tools into operating position for the operation desired. This time loss results in a loss of productivity of the machine tool.

There are tool holder turrets known which are provided with an automatic control of the change of tools. However, all known tools of this type are complicated and expensive and furthermore, their locking devices do not insure precise and rigid positioning of the tool holder body. Lack of precise and rigid positioning of the tool holder body results in a lack of precision of the machining operation.

It is an object of the present invention to avoid the aforementioned drawbacks in a very simple manner by realizing economy of cost for a tool holder turret with automatic control of the change of tools for a machine tool adapted to effect several machining operations, as, for example, effecting the roughing down and finishing of a piece of work in one chucking of the work.

The objects of this invention are accomplished in one embodiment by providing a tool holder body generally centered on an axle secured to the machine. The axle serves to guide a piston and a movable segment connected to the body, the piston and the segment together with the body being adapted to react to the action of a pressure fluid source for lifting and rotational movements of the tool holder body. Abutments are provided by the axle to limit the lifting and rotational movements of the body and a pressure spring is provided to lower the tool holder body, maintain it against its support and simultaneously insert positioning pins into bushings on the machine.

In a preferred embodiment of the present invention, the pressure spring may be arranged between an abutment on the axle, which limits the lifting or longitudinal movement of the body, and a cover of the body.

The positioning pins are provided at one of their ends with a plurality of contact faces, one such pin having, in the preferred embodiment, three contact faces whereby that pin when engaged in a conically bored bushing serves as a pivot point for the body while the other of the pins is preferably provided with two contact faces, defining a general plane perpendicular to a theoretical line from the center of the body through the pin. The positioning pin with but two contact faces, when engaged in a conically bored bushing, serves to render the tool holder body laterally stable. Since the positioning pins in combination furnish not only precise positioning but also rigidity for the tool holder body, the fit of the body on the axle must be loose to enable the pins to perform their function.

In the preferred embodiment, the tool holder body may be provided with lateral supports to allow for rapid mounting of the tool holders on the body.

Other features and advantages of the present invention will be apparent from the following description of a preferred embodiment, given by way of example only, in conjunction with the accompanying drawings, in which:

FIG. 1 is a longitudinal section through one embodiment of a tool holder turret according to this invention taken generally along the line 1—1 of FIG. 2;

FIG. 2 is a cross-sectional view of the tool holder turret of FIG. 1 taken generally along the line 2—2 of FIG. 1 and including a diagrammatic showing of the hydraulic circuit.

FIG. 3 is an exploded perspective of the three faced pin of this invention shown in relationship with its bushing which is partially in section. FIG. 4 is an exploded perspectve of the two faced pin of this invention shown in relationship with its bushing which is partially in section.

Referring now to the drawings, cross slide 10 of a machine tool furnishes a flat base and carries bushings 12 and 14. Bushings 12 and 14 are provided respectively with conical borings 16 and 18, said borings being of identical dimensions. Axle 20 with borings 22, 24, and 26 is secured to slide 10 and serves to guide tool holder body 28. Tool holder body 28 is supported on base 30 which in turn is provided with cover 32. Lateral supports 34 are provided for rapid chucking of the interchangeable tool holders 36 and 38. Tool holders 36 and 38 carry tools 40 and 42 respectively, the tools being preferably adjusted thereon prior to placing the tool holders 36 and 38 on the turret. The work to be machined is shown in FIG. 1 designated generally by the reference numeral 44. Positioning pins 46 and 48 may form a part of body 28 and are provided respectively with truncated heads 50 and 52. Positioning pin head 50 is of frusto-pyramidal shape and is provided with three contact faces 50A, 50B and 50C while positioning pin head 52 is of frusto-wedge shape and has but two contact faces 52A and 52B defining a plane generally perpendicular to a line through pin head 50 and pin head 52. Positioning pin head 50, when engaged in one of the conical borings 16 or 18, serves as a pivot point for body 28. Positioning pin head 52, when engaged in the other of the conical borings 16 or 18, serves to render body 28 laterally rigid. Pin heads 50 and 52 serve, therefore, to provide precise positioning of tool holder body 28 as well as rigidity. If, for example, due to temperature change or low tolerance machining, the distance between the center points of the head 50 and 52 should be different than the distance between the center points of conical borings 16 and 18, positioning pin head 52 will accommodate the difference due to its ability to move short distances vertically in one of the conical borings 16 or 18. Pins 46 and 48 are placed respectively at diametrically opposite points of the tool holder body 28 so as to obtain a broad base for stability and more exact positioning of tool holder body 28. In addition, rigidity and precision of positioning is enhanced due to the fact that pins 46 and 48 are rigidly fixed with regard to body 28.

Base 30 is further provided with annular grooves 54 and 56 as well as with borings 58 and 60. Segment 62 having plane end surfaces 64 and 66 rides in a body recess and acts as a piston for pivoting body 28 about axle 20 in a manner described in detail below. Segment 62 is provided at its faces 64 and 66 with pins 68 and 70 respectively. Pins 68 and 70 act as abutments for the movements of segment 62, and, to this end, cooperate with stationary abutment 72. Piston 74 provided with annular cut-out 76 rides in a recess of body 28, which body is spring-loaded towards one of its end positions by pressure spring 78. The stroke of piston 74, and consequently of body 28, against the action of spring 78 is limited by an abutment 80.

Conduits A and B are used to supply pressure oil as required to manipulate the tool holder body and are connected to automatic control valve device V whose automation may be effected in conventional ways to supply pressure oil selectively to either conduit A or B from an oil reservoir and sump S via conduit C connected between the valving device V and the sump S and containing a conventional pump P and to bleed pressure oil from conduits A and B through said valving device V to sump S via conduit D connected between said valving device V and said sump S.

The operation of the described tool holder turret is generally accomplished automatically during the return stroke of the cross slide in the following manner:

In FIGS. 1 and 2 tool holder body 28 is shown with roughing tool 40 in working position. In order to put tool 40 out of working position and to lead finishing tool 42 into working position, valving device V is manipulated so that conduit A is provided with pressure fluid from pressure source pump P while valving device V also is operated to connect conduit B with sump S via conduit D. The pressure fluid from conduit A flows through boring 26 and loads piston 74 which, in turn, lifts tool holder body 28 and abutment 72, thereby compressing spring 78 until the stroke is stopped by abutment 80. Hereafter, the fluid enters circular groove 54 and fills boring 58 so as to act against the surface 64 of segment 62 which thereby, acting as a piston, rotates about axle 20 in a direction indicated by arrow X in FIG. 2 until pin 70 abuts abutment 72. Segment 62 is now in the position indicated in dot-and-dash lines in FIG. 2 and has carried body 28 with it so as to bring finishing tool 42 into approximate working position. In order to lower tool holder body 28 against operating slide 10 and precisely place finishing tool 42 in operating position, valving device V is manipulated to cut off the pressure in conduit A and allow pressure fluid in conduit A to bleed to sump S via conduit D. Pressure spring 78 pushes tool holder body 28 against its support on the machine 30. Body 28 is precisely positioned by the pair of pins 46 and 48, the heads 50 and 52 of which enter conical bores 16 and 18 of bushings 12 and 14 of the machine slide. Due to the pressure supplied by spring 78, pressure in the hydraulic system is not needed to maintain body 28 in seated position against slide 10 and consequently, pump P is normally inactive during periods of operation.

The contact faces 50A, 50B and 50C of pin head 50 are disposed at about 120° angles about the axis of pin 46. The two contact faces 52A and 52B of pin head 52 of pin 48 are disposed generally in a plan perpendicular to a line running through the center of axle 20. The contact faces 50A, 50B, 50C, 52A and 52B are, on their respective pins, adapted to fit along their faces the identical conical bores 16 and 18. The purpose of this arrangement is as follows: Axle member 20 is secured to slide 10. In order to allow free movement of body 28 of the tool holder along the axis of axle 20 and also free rotational movement about axle 20, the fit of the body 28 of the tool holder upon axle 20 must be fairly loose, i.e. the play between the body 28 and the axle 20 should be chosen larger than would be necessary for said free movements of the body 28. This makes it possible to manufacture the parts with conventional rather than with high-accuracy tooling, thus avoiding high cost of the tool holder. When tool holder body 28 is in an operating position as shown in FIGURE 1, the axle, due to the said loose fit, does not contribute materially to the stability of the tool holder body 28. The stability is obtained primarily by the functions of the heads of pins 46 and 48.

With reference to the Figures, when head 50 of pin 46 is engaged in conical boring 16 of bushing 12 of slide 10, because of its three faces 50A, 50B and 50C, the tool holder body is rigidly positioned in the direction of the line running through the two centers of the pins 46, 48, despite the loose fit of the tool holder body 28 on the axle 20; in other words, with only head 50 of pin 46 engaged in bushing 12, tool holder body 28 is restricted in its movement in the direction along the line 1—1 of FIG. 2 although the lateral movement of tool holder body 28 is not so restricted about axle 20. When the wedge-shaped head 52 of pin 48 enters the other conical boring 18 in slide 10, tool holder body 28, due to two faces 52A and 52B of pin 48, is rendered laterally rigid. Therefore, with the ends of pins 46 and 48 both engaged in conical borings 16 and 18, the tool holder body is rendered rigid in all directions, despite its loose fit on axle 20, because of the symmetry of the conical borings of the two bushings 12 and 14, the principal of positioning as just described is the same for the two possible positions of the turret body at 180° angles of rotation.

If roughing tool 40 is to be brought back into operating position, valving device V is manipulated so that conduit B is supplied with pressure fluid from pump P and conduit A is connected through valving device V to conduit D so as to communicate with sump S. Now the pressure fluid in conduit B passes through borings 24 and 22 into circular groove 76 of piston 74 and lists tool holder body 28. Positioning pin heads 50 and 52 are at this time clear of bushings 12 and 14. In order to rotate segment 62 in the direction of arrow Y from the position shown in dot-and-dash lines to the position shown in full lines (FIGURE 2), the pressure fluid from conduit B also flows into circular groove 56 and into boring 60, thereby loading the face 66 of segment 62 so as to rotate back about axle 20 the segment 62 and with it body 28. Valving device V is now operated to cut off pressure fluid in conduit B and to allow the latter to bleed via conduit D to sump S so that pressure spring 78 again reseats body 28 on slide 10. Pin heads 50 and 52 of pins 46 and 48, respectively, perform the same positioning functions as above in conical borings 16 and 18.

Having thus provided a written description of the present invention and provided specific examples thereof, it should be understood that no undue restrictions or limitations are to be imposed by reason thereof but that the present invention is defined by the appended claims.

I claim:

A tool holder turret indexable hydraulically into two positions more particularly respectively for roughing down the finishing operations during a single chucking of a work piece with appropriate tools for the respective operations, said turret comprising a slide having a flat surface, a central axle secured fixedly to said slide and extending from its said flat surface, a tool holder body mounted on said axle to move freely axially thereof and also being freely rotatable thereon, said body having annular grooves and borings respectively communicating therewith, said body having a pair of recesses, a piston positioned within one of said recesses, said axle having borings communicating with opposite sides of said piston, and said slide having passageways selectively connectable with a pressure source and communicating with said last-named borings, a pressure spring mounted on said axle to bias said body towards said flat surface, an abutment to limit axial movement of said body on said axle away from said flat surface, a segment-shaped part having plane end surfaces positioned in the second of said recesses and secured to said body to serve as a piston responsive to fluid pressure to rotate said body in selected indexing directions on said axle, a stationary abutment in said second recess cooperating with said end faces of said segment for limiting the extent of indexing rotation of said body in either direction about said axle, means for controlling supply of pressure fluid from said source selectively to said passageways so as to feed the fluid selectively therefrom to the respective borings in said axle to displace the body axially of said axle away from said flat surface in opposition to said spring and thereafter via the annular groove in the body then registering with the pressure-supplying boring of the axle into the body boring communicating with such groove so as to act against the appropriate end surface of the segmental shaped piston and rotate said body in desired indexing direction on said axle to the limit permitted by said stationary abutment, means for thereafter removing pressure from the pressure-supplying boring to permit said pressure spring now in compressed state to move said body back into contact with said flat surface, a pair of fixed pins mounted on said body and having protruding ends, a pair of bushings with conical recesses opening in said flat surface into which said protruding ends of said pins will penetrate when said body is moved by said spring against said flat surface, one of the protruding ends of said pins being generally frusto-pyramidal in shape with at least three tapered surfaces and the other of said protruding ends being generally frusto-wedge shaped with two tapered surfaces, the penetration and engagement of said pins in said conical recesses serving to rigidly fix the body on said axle against any lateral displacement thereon and to lock it in its selected indexed position on said axle.

References Cited in the file of this patent

UNITED STATES PATENTS

| | | |
|---|---|---|
| 2,305,728 | Millholland | Dec. 22, 1942 |
| 2,319,895 | Walker | May 25, 1943 |
| 2,683,301 | Picand et al. | July 13, 1954 |
| 2,915,922 | Freer | Dec. 8, 1959 |
| 2,952,169 | Johnson | Sept. 13, 1960 |